J. C. STEVENS.
WATER LEVEL RECORDER AND VOLUME METER.
APPLICATION FILED JULY 23, 1917.

1,356,322.

Patented Oct. 19, 1920.
3 SHEETS—SHEET 1.

Inventor
John C. Stevens
By
Sturtevant & Mason
Attorney

Witnesses

J. C. STEVENS.
WATER LEVEL RECORDER AND VOLUME METER.
APPLICATION FILED JULY 23, 1917.
1,356,322.
Patented Oct. 19, 1920.
3 SHEETS—SHEET 2.
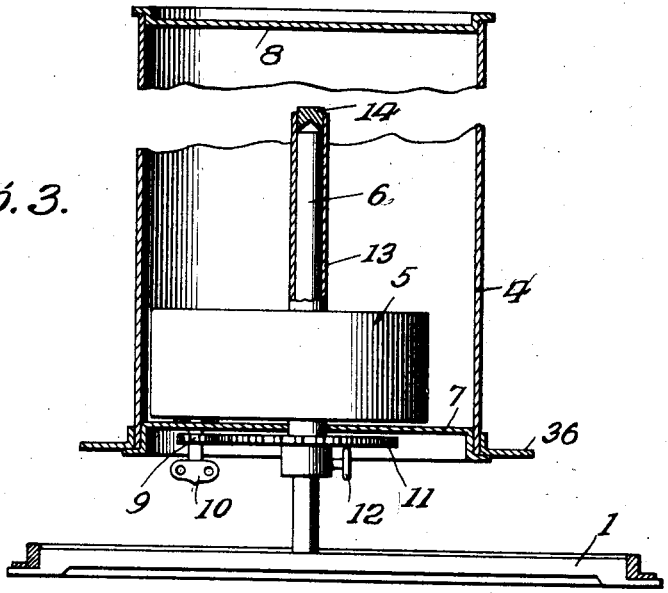
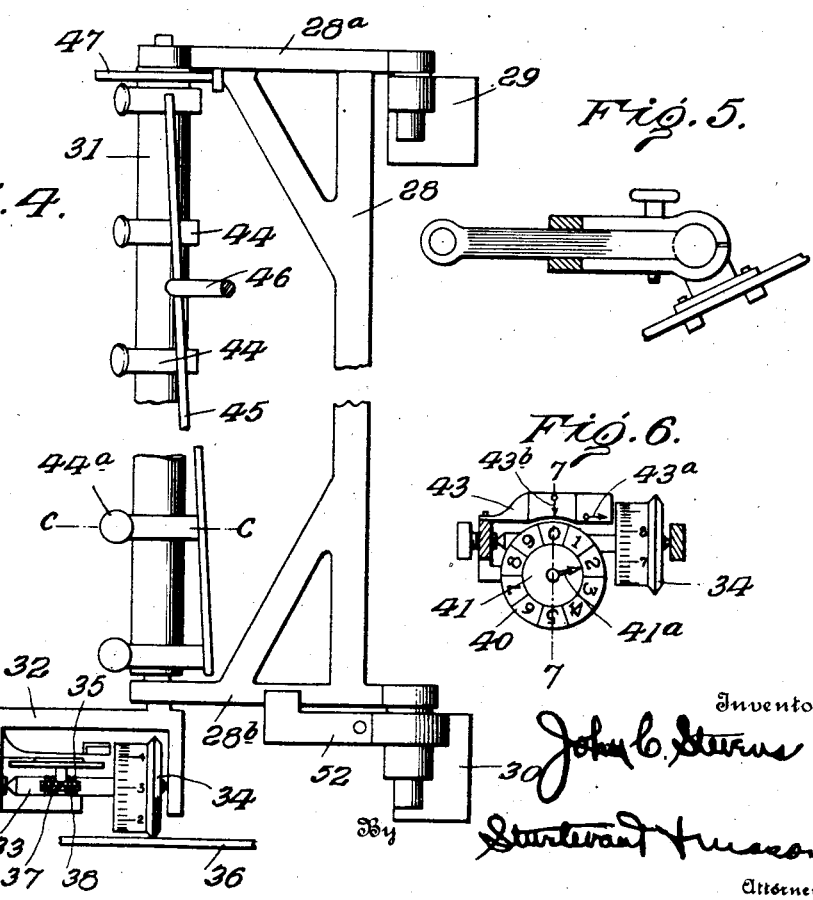
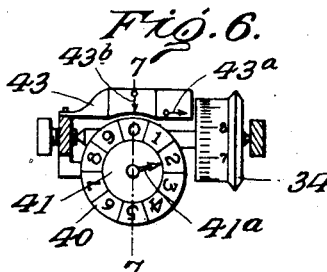
Inventor
John C. Stevens
By Sturtevant Mason
Attorneys
Witnesses J. C. STEVENS.
WATER LEVEL RECORDER AND VOLUME METER.
APPLICATION FILED JULY 23, 1917.

1,356,322.

Patented Oct. 19, 1920.

Witnesses

Inventor
John C. Stevens
By Sturtevant & Mason
Attorneys

UNITED STATES PATENT OFFICE.

JOHN C. STEVENS, OF PORTLAND, OREGON.

WATER-LEVEL RECORDER AND VOLUME-METER.

1,356,322.  Specification of Letters Patent.  Patented Oct. 19, 1920.

Application filed July 23, 1917. Serial No. 182,273.

*To all whom it may concern:*

Be it known that I, JOHN C. STEVENS, a citizen of the United States, residing at Portland, in the county of Multnomah, State of Oregon, have invented certain new and useful Improvements in Water-Level Recorders and Volume-Meters, of which the following is a description, reference being had to the accompanying drawing and to the figures of reference marked thereon.

The invention relates to new and useful improvements in water level recorders and volume meters for measuring the volume of water passing a given point.

An object of this invention is to provide a simple, inexpensive water level recorder for weirs, flumes, sewers, oil tanks or wherever a graphic representation of the fluctuations of any water surface is desired.

Another object of the invention is to provide an integrating attachment for the water level recorder that can be fixed to said recorder at any time and which will operate to record the total volume of water that passes a given point.

Another object of the invention is to provide an integrating attachment having an adjustable cam so that the same instrument may be set to record the total volume of water passing the instrument in any desired units of volume under any conditions where the height of the water surface is an index of the flow.

In the drawings, which show by way of illustration, one embodiment of the invention:—

Fig. 3 is a detail in section through the recording cylinder and showing the position of the clock mechanism for operating the cylinder;

Fig. 4 is a front view of the integrating attachment;

Fig. 5 is a plan view of the part of the supporting bracket of the integrating attachment and the positioning stop therefor;

Fig. 6 is a plan view of the recording mechanism of the integrating attachment;

Figure 1:
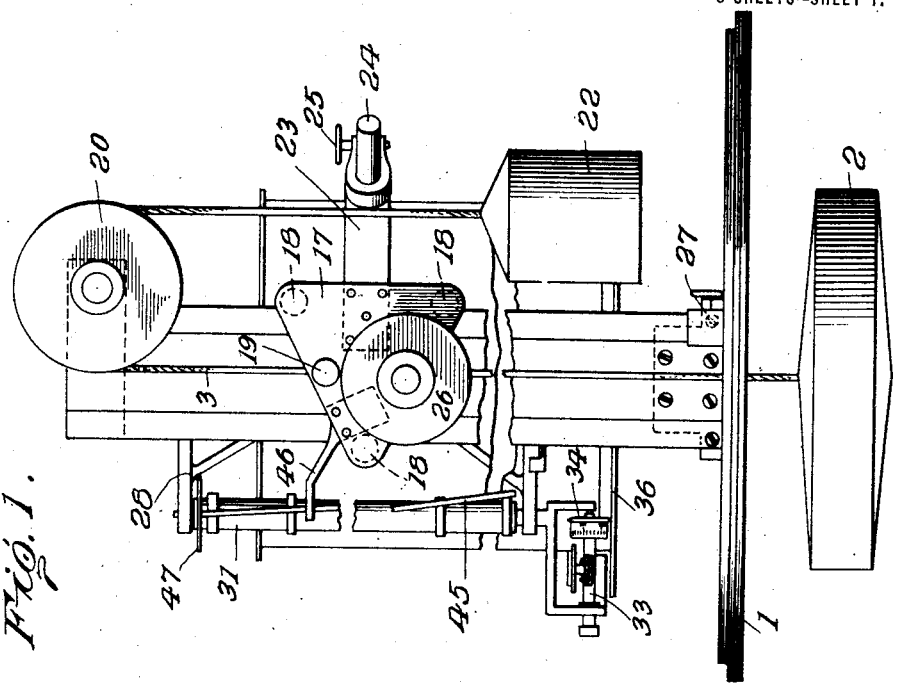
Figure 1 is a front elevation of an apparatus embodying my improvement, the outer casing being removed to show the inner parts.
Figure 2:
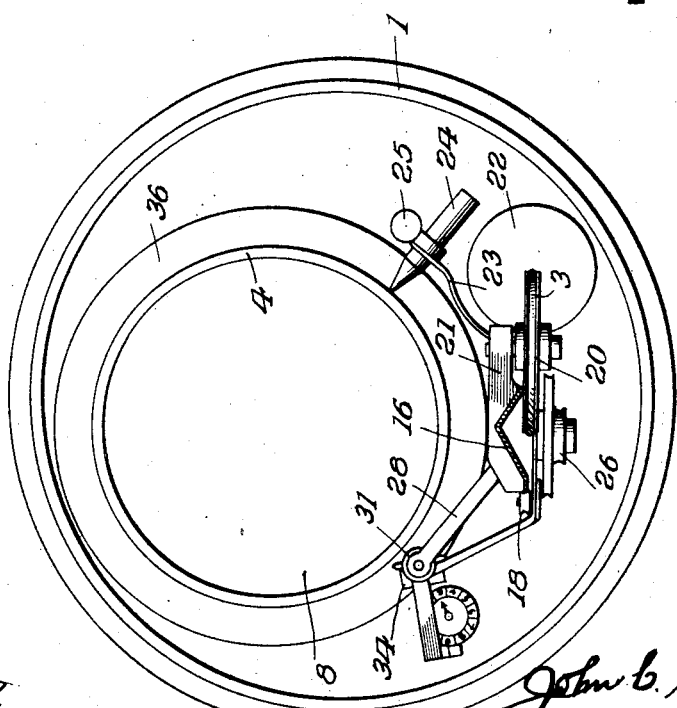
Fig. 2 is a plan view of the same.
Figure 7:
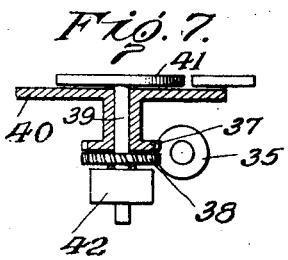
Fig. 7 is a sectional view on the line 7—7 of Fig. 6.

The invention consists generally in a water level recorder having a supporting base on which is mounted a rotating drum. The drum rotates about a vertical axis and is operated by timing mechanism so as to turn through a fixed distance each day or fraction thereof. Traveling up and down the cylinder is a carriage carrying a pencil and this carriage is connected to the float resting on the surface of the liquid, the level of which is to be recorded. The float is connected by suitable cable to the carriage. All of the parts are inclosed in a casing which is so constructed as to protect the more or less delicate parts of the instrument from dust and from dampness.

The recording instrument is adapted to be used for recording the level of water in weirs, flumes and the like. As a matter of fact, it may be used wherever a graphic representation of fluctuations of a liquid surface is desired, and it is understood that the term "water" as used herein shall include any mobile liquid.

Associated with this water recorder is a water meter. The cylinder for the record is provided with a flange extending outwardly therefrom and resting on this flange is a planimeter wheel. The angle that the planimeter wheel is presented to its line of bodily movement along the flange, is varied by the height of the carriage carrying the pencil which indicates the height in the water level. Through a suitable recording mechanism the revolutions of the planimeter wheel are recorded and as the bodily travel of the planimeter wheel along the flange is controlled by the timing mechanism this recording mechanism may be readily adapted for recording the volume of water passing a given point under certain fixed given conditions.

Referring more in detail to the drawings, my improved water recorder and water meter consists of a circular base 1 which is adapted to receive an inclosing metal cover (not shown in the drawings). A hollow metal recording cylinder is adapted to carry the sheet of paper on which the record is made and this sheet of paper is graduated so as to indicate time as one coördinate and height as another. The time coördinate extends circumferentially about the cylinder while the height coördinate extends lengthwise of the cylinder. Carried by the base 1 is a fixed vertical shaft or supporting post and the hollow cylinder is supported by this post and rotates about the same. The shaft terminates in a hardened steel point at its upper end. The hollow metal cylinder 4 is provided with end pieces 7 and 8. The end piece 7 is fixed to a sleeve 13 having a bearing block 14 at its upper end and this bearing block rests on the pivotal point of the fixed shaft 6. Extending about the sleeve 13 and fixed to the plate 7 is a clock mechanism, indicated at 5 in the drawings. A small gear 9 is fastened to the winding stem of the clock which winding stem projects through the end plate 7 and is packed with a felt washer placed between the clock and the end plate 7, to prevent the entrance of dust around the winding stem. This winding stem is adapted to receive a key 10 by which the clock may be wound. The gear 9 meshes with a gear 11 which is fixed by a set screw 12 to the shaft 6. The gears 9 and 11 can be so proportioned that as the clock runs the recording cylinder will turn around the fixed shaft in a given length of time, for example, making one revolution in eight days.

From the above description, it will be apparent that the recording cylinder can be readily lifted off for adjusting or winding the clock. It can also be adjusted to indicate any day or time of day by lifting the cylinder until the gears are out of mesh and then turning the cylinder to the desired point.

Figure 10:
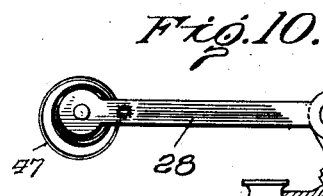
Fig. 10 is a sectional view, showing the upper supporting bracket of the integrating attachment, the spring for rotating the controlling shaft thereof, the carriage of the recording instrument and the supporting track for the carriage.

The recording instrument for forming the record on the record sheet includes a pencil 24 which is secured to a bracket arm 23 by a set screw 25. This bracket arm 23 is carried by a traveling carriage 17 arranged so as to travel easily up and down on the carriage track 16. Said carriage track is in the form of a metal plate bent to an angular cross section to give rigidity thereto, (see Fig. 10). The carriage 17 is triangular in outline and held to the track by three small grooved pulleys 18. On the back side of the carriage there is a gripping device 19 which includes a space gripping plate 19$^a$ and a set screw 19$^b$. A cable 3 is attached to a float 2 and this cable is secured by the gripping device 19 to the carriage 17. The cable passes upward from the float through a hole in the base 1, thence through the gripping device 19 and thence over a grooved pulley 20 mounted on a bearing block 21 fastened to the top of the track 16. A counter-poise 22 is secured to the other end of the cable and keeps the same taut.

The pencil arm 23 is formed of spring metal so that the point of the recording pencil is yieldingly pressed against the recording sheet. The pressure of the pencil against the sheet may be varied by pushing the pencil in or out of the pencil holder and clamping it in said position by set screw 25.

From the above description it will be evident that as the float rises and falls with the water surface, the pencil may also move the same amount and in the same direction. The combination of this vertical movement of the pencil and the circular movement of the recording cylinder will produce a graphic representation of the fluctuations of the water surface on the recording sheet to the scale of one. To obtain a scale of one-half, the cable 3 is passed over the groove pulley 26, attached to the carriage 17 in which case the float will be shifted slightly to the left, as viewed in Fig. 1. In this case the end of the cable will be attached to the base by a clamp 27. Another short piece of cable would then be attached to the carriage by the gripping device 19 and this short piece of cable will pass over the pulley 20 and be secured to the counterweight 22. It is evident from this arrangement that the pencil will move in the same direction as the float but only one-half the distance of the movement of the float and hence a graphic record of the water fluctuations is obtained to a scale of one-half.

Figure 13:
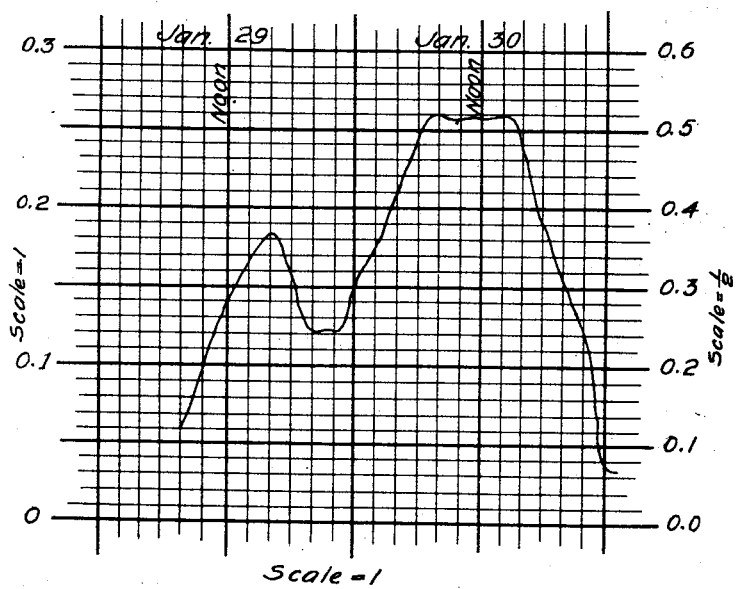
Fig. 13 is a section of the record made by the recorder.
Figure 12:
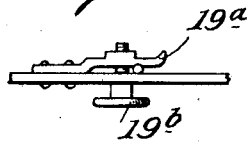
Fig. 12 is a detail showing the manner of attaching the cable to the pencil carriage.

In Fig. 13 of the drawings, I have shown a sample record sheet which is graduated so as to indicate time coördinates and height coördinates. The graduations to the left of the record sheet are to the scale of one and these graduations will be used in reading the water level when the parts are arranged as shown in Fig. 1 of the drawings. The graduations at the right of the sheet are to the scale of one-half and will be used for reading the water levels when the cable is passed about the pulley 26 and secured to the clamp 27, after the manner above described.

The integrating attachment forming a part of my water level recorder and water meter, is shown more in detail in Figs. 4 to 10 inclusive. This integrating attachment includes two supporting horizontal arms 28$^a$ and 28$^b$. These arms are mounted to turn in bearings 29 and 30 respectively, which are fastened to the carriage track 16, (see Figs. 5 and 10). Mounted to turn freely in the arms 28$^a$ and 28$^b$ is a vertical shaft 31. The lower end of this shaft is rigidly fixed to a yoke 32. Between the two arms of this yoke is pivoted a horizontal shaft 33 which carries a planimeter wheel 34 and a small worm 35. The planimeter wheel 34 supports the weight of the shaft 31 through the wheel resting on a flange 36. This flange 36 is made to slip over the recording cylinder 4, after the top plate 8 is removed and said flange is secured to the cylinder so as to rotate therewith.

In mesh with the worm 35 are two gears 37 and 38 which are of the same diameter. The gear 37, however, has ten teeth while the gear 38 has eleven teeth. The gear 37 is fixed to a sleeve carrying a plate 40 graduated into ten divisions and numbered, (see Fig. 6). The shaft 39 carries the gear 38 and also extends through the sleeve of the gear 37 and forms a support therefor. This shaft 39 carries an index $41^a$ which is associated with the graduations on the plate 40. The shaft 39 is mounted in a bearing 42 on an arm secured to the yoke 32. The hub of the planimeter wheel 34 is graduated into ten divisions, each of which is also divided in ten parts or divisions, making one hundred divisions on the hub. A bent plate or bracket 43 is attached to one arm of the yoke 32 and carries the indices $43^a$ and $43^b$. The former pointing to the graduations on the hub of the planimeter wheel and the other to the graduations on the plate 40. As the planimeter wheel 34 turns the index $43^a$ shows a fraction of its revolution in 100ths. For each complete revolution of the planimeter wheel the plate 40 turns one space, hence the index $43^b$ shows the whole number of revolutions of the planimeter wheel. The plate 41, as above noted is carried by a gear 38 which has eleven teeth but which meshes with the same worm as gear 37. For each complete revolution of the shaft 39 and the index $41^a$ the plate 40 will make $\frac{11}{10}$ of a revolution, hence the index $41^a$ will move one division relative to the plate 40 and will indicate the number of whole revolutions of the plate 40. By the above arrangement, the total number of revolutions and fractions thereof of the planimeter wheel is indicated by the three indices up to 99.99. For example, the reading in Fig. 6 is seen to be 20.84.

Figure 8:
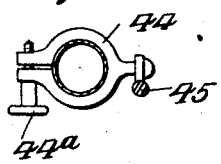
Fig. 8 is a sectional view on the line c—c of Fig. 4.
Figure 9:
Fig. 9 is a detail showing a section of the cam rod and the support therefor.

The shaft 31 carries a number of rings 44, one of which is shown in plan view in Fig. 8 of the drawings. These rings are split at one side and are secured to the shaft 31 by a set screw $44^a$. Attached to each ring in the series is a round rod or cam 45, preferably made of spring wire, the same length as the recording cylinder. It is evident that this rod 45 may be, by the aid of the rings, fastened so as to form any desired form of a low pitch spiral about the shaft 31. Fastened rigidly to the pencil carriage 17 is an arm 46 which bears against this rod or cam 45. At the top of the shaft 41 is a spiral spring 47, one end of which is fastened to the shaft and the other end of which is fastened to the supporting arm $28^a$, in such a manner as to normally turn the shaft to hold the rod or cam 45 against the arm 46. As the pencil carriage rises and falls with the float controlled by the varying height in the water level, it will cause the shaft 31 to turn vertically about its bearings any amount depending entirely upon the position of the rod or cam spiral 45, which is fastened thereto.

Figure 11:
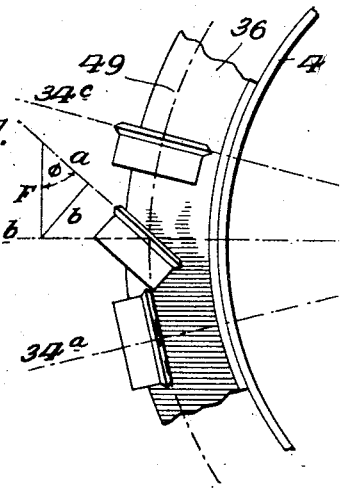
Fig. 11 is a diagrammatic view showing different positions of the planimeter wheel and a section of the flange of the recording instrument for operating the same.

Referring to Fig. 11 of the drawings, it will be noted that the planimeter wheel 34 rests at one point only, on the flange 36 which turns with the recording cylinder. If the support 28 is held in a fixed position this point will describe a circle 49 on the flange which may be called a planimeter circle. Since the shaft 31 is turned as the pencil carriage moves up and down, it is evident that the plane of the planimeter wheel 34 will assume varying angles with the radius of the planimeter circle 49. Let this angle, at any position of the pencil be $\phi$. The force of friction between the flange 36 and the wheel 34 is always exerted at the single point of contact in the planimeter circle and in a direction tangential to this circle at said point. This force may be represented by the line F in Fig. 11. The force may be resolved in two components, $a$ and $b$, as shown in said figure. Evidently, $a$ is the component that causes the planimeter wheel to turn and may be represented by $a = \cos \phi$. Three positions of the planimeter wheel are shown in Fig. 11. At the position $34^a$ the angle $\phi$ is 0 and hence the component $a = F$ and the planimeter wheel turns directly with the planimeter circle. At $34^c$ the angle $\phi$ is 90° and $a = 0$. At this position the planimeter wheel slides on the planimeter circle there being no turning movement imparted to it. At any intermediate value of $\phi$ as at $34^b$ there is both sliding and turning movement imparted to the planimeter wheel, as above outlined. The rod or cam 45 is never set so as to cause more than $\frac{1}{4}$ of a revolution of the shaft 31 so that the angle $\phi$ can only have values between 0° and 90°. When the pencil is in its lowest position or at 0 height on the record sheet the angle $\phi$ will be 90° and only sliding motion will obtain on the planimeter circle. When the pencil is at any other position on the record sheet the angle $\phi$ will have some tangible value. For example, 90° for the highest point of the pencil and turning movement will be imparted to the planimeter wheel.

The operation and adjustment of this integrating attachment will be illustrated by a concrete example. Assuming that the recorder is placed with the float just above a trapezoidal weir with a crest length of two feet. The pencil will then record continuously the head on the weir. From any standard weir table it may be found that the flow for 0.1 feet head is 0.21 second-foot; for 0.2 feet head the flow is 0.60 second feet; for 0.4 feet head, 1.70 second feet, etc. One second foot flowing for twenty-four hours is 2 acre-feet or thereabout and hence for the foregoing values for twenty-four hour runs, we have 0.1 foot head=0.42 acre feet; 0.2 feet head=1.2 acre feet; 0.4 feet head=3.40 acre feet.

To adjust the attachment to record these quantities set screw 12, in Fig. 3, is loosened and the gear 11 dropped out of mesh with the gear 9. The recording cylinder is now turned freely. The pencil carriage is set at the point 0.00 head on the record sheet. The rings 44 that carry the spiral rod or cam 45 are preferably so shaped as to be opposite the arm 46 when the pencil points at even tenths of feet on the record sheet. The rod or cam is adjusted against the arm 46 until the planimeter wheel is in line with a radius of the planimeter circle or until a position of no turning is indicated by the index $43^a$, when the record cylinder is turned about its axis. The carriage is then shifted to bring the pencil point to 0.10 feet on the record sheet and the next ring bearing against the rod 46 is shifted until 0.42 revolutions are indicated by the index $43^a$, when the cylinder is turned the space of one day, as shown by the pencil. The carriage is then positioned with the pencil at 0.2 feet on the record sheet and the next ring is adjusted against the arm 46 until the indices $43^a$ and $43^b$ show that when the cylinder is turned the space of one day the planimeter wheel will show 1.2 revolutions. Similarly, the other rings are shifted and thus the planimeter wheel is calibrated for indicating the volume of water passing over the weir. Once adjusted, with the recorder in operation the planimeter wheel will continue to slide and turn on the flange 16, the relative amounts of each corresponding with the heights of the water surface. The number of revolutions and fraction thereof of the planimeter wheel as found by the difference of readings of the three indices between successive visits, is the total number of acre feet or other unit volume which has passed the weir between such visits.

If for example the wier had been twenty feet long, the quantity would have been ten times as large and the rod or cam 45 would have been adjusted to $\frac{1}{10}$th the readings on the indices. Then again, if the readings had been desired in cubic meters instead of acre feet, the instrument can be readily set for calculating the volume in such units. One acre foot=1233 cu. meters and a 0.1 foot head corresponds to 518 cu. meters per day, hence this rod or cam 45 will be set to read .518 revolutions for a space of one day and the decimal point in the result set to correspond. Evidently, also the head can be expressed in inches or centimeters or any other unit. It is also evident that the recorder may be set to give the height of water over any type of device, weirs of any type or design, rating flumes, ditches, orifices or any place where the height of water is an index of the flow.

Around the hub of the lower bearing 30 on the support 28 is an adjustable arm 52 with a yoke stop for the lower arm of the support 28. The arm 52 may be clamped in any position by a set screw and the position of this arm determines the size of the planimeter circle. By shifting the arm, the diameter of the circle may be varied slightly. The support 28, however, and the planimeter wheel may be swung away from the flange 36 after raising the support 28 to free the arm $28^b$ from the yoke stop on said arm 52. This facilitates the removal of the record cylinder 44 and insures that the support 28 when returned to its operative position will always have the same position.

It is obvious that minor changes in the details of construction and arrangement of parts may be made without departing from the spirit of the invention, as set forth in the appended claims.

Having thus described my invention, what I claim as new and desire to secure by Letters Patent, is:—

1. A combined water level recorder and volume meter including in combination means for recording the level of the water at a given point during a fixed period of time, and means for indicating the volume of water passing said point during said period of time.

2. A combined water level recorder and volume meter including in combination a rotating cylinder, a float, means controlled by said float for recording on said cylinder the water level and means controlled by said float for indicating the volume of water passing the meter in a given period of time.

3. A combined water level recorder and volume meter including in combination a cylinder rotating about a vertical axis, a carriage movable lengthwise of said cylinder, a float for controlling said carriage, a pencil carried by the carriage for recording the water level on the cylinder and means controlled by the carriage and cylinder for indicating the volume of water passing the meter in a given period of time.

4. A combined water level recorder and volume meter including in combination means for recording the water level during a period of time and means for measuring the volume of water passing the meter in said period of time, said volume measuring means including an adjustable cam or rod which is adapted to be set to indicate the volume of flow in any desired units.

5. A combined water level recorder and volume meter including in combination a rotating cylinder having a projecting flange, timing means for rotating said cylinder, a float, means controlled by the float for recording the water level on said cylinder, a planimeter wheel engaging the flange on said cylinder and means for positioning the planimeter wheel so that the rotations imparted thereto by the flange will vary with the height of the water level being recorded.

6. A water volume integrating instrument including a rotating member, a timing means for rotating said member, a planimeter wheel having contact with said member and operated thereby and means controlled by the water level for shifting the angular position of the planimeter wheel as the height in the water level varies.

7. A volume integrating instrument including in combination a member rotating about a vertical axis, a vertically disposed shaft, a planimeter wheel carried thereby and resting on said rotating member, said planimeter wheel being disposed to turn about a horizontal axis and means controlled by the water level for turning the vertical shaft about its axis to vary the position of the planimeter wheel corresponding to the water level.

8. A water volume integrating instrument including in combination a member rotating about a vertical axis, a planimeter wheel rotating about a horizontal axis carried by said shaft and bearing against said member, said vertical shaft having an adjustable cam or rod, a vertically movable carriage controlled by the water level and an arm carried by said carriage and coöperating with the said cam or rod for rotating the vertical shaft as the water level varies.

9. A water volume integrating instrument including in combination a member rotating about a vertical axis, a planimeter wheel rotating about a horizontal axis carried by said shaft and bearing against said member, said vertical shaft having an adjustable cam or rod, a vertically movable carriage controlled by the water level and an arm carried by said carriage and coöperating with the said cam or rod for rotating the vertical shaft as the water level varies, and means for indicating the number of revolutions of said planimeter wheel for a given travel of the rotating member.

10. A water volume integrating instrument including in combination a cylinder rotating about a vertical axis, said cylinder having a projecting flange thereon, a vertically disposed shaft, a planimeter wheel rotating about a horizontal axis carried by said vertical shaft and bearing against said flange having mechanism for rotating said cylinder, a carriage movable lengthwise of the cylinder, a float for controlling said carriage, a series of rings connected to said vertical shaft, a rod or cam attached to said rings and adapted to be spirally positioned relative to the shaft through the adjustment of said rings, an arm fixed to said carriage and adapted to engage said rod or cam, a spring for turning said vertical shaft for holding said rod or cam in engagement with the arm and means for indicating the number of revolutions and fractional parts thereof of the planimeter wheel for a given fractional rotation of the cylinder.

11. A combined water level recorder and volume meter including in combination means for recording the water level during a period of time and means for indicating the integrated volume of water passing the meter in said period of time, said integrating means including an adjustable cam or spiral which is adapted to be set to indicate the volume from any device or condition wherein the height of water is an index of flow and also in any desired units of volume.

12. A combined water-level recorder and volume meter including in combination a clock driven cylinder, recording means controlled by the height of said water level for recording the water level on said cylinder, and independent means controlled by the movement of said recording means and the rotation of said cylinder for indicating the volume of water passing the meter in a given period of time.

In testimony whereof, I affix my signature in the presence of two witnesses.

JOHN C. STEVENS.

Witnesses:
GARLAND BINDER,
BLANCHE CONARD.